Sept. 15, 1936.  L. L. JONES  2,054,086
METHOD OF SOLDERING CAN BODIES OR THE LIKE
Filed Oct. 31, 1929  2 Sheets-Sheet 1
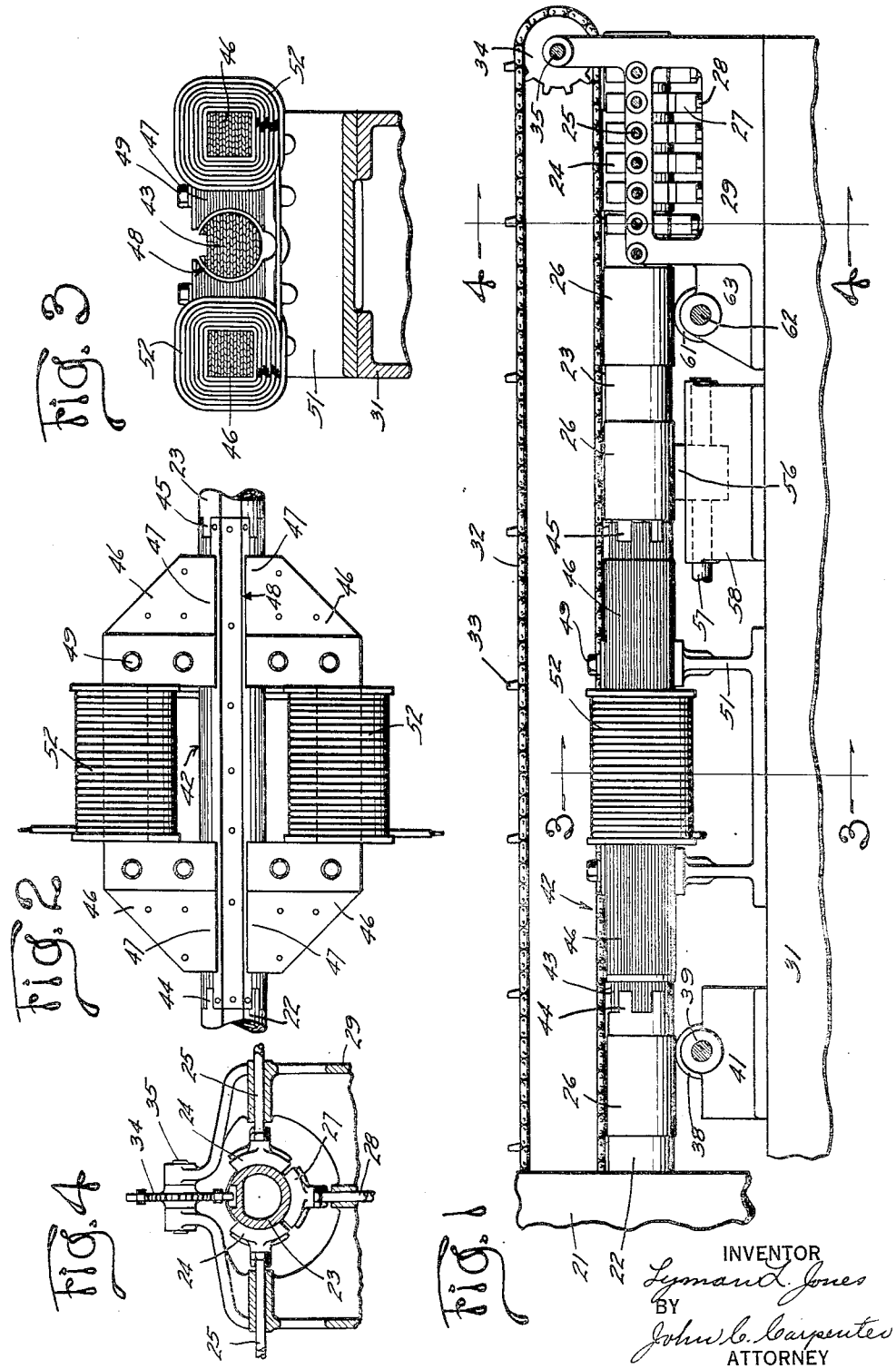
INVENTOR
Lyman L. Jones
BY
John C. Carpenter
ATTORNEY

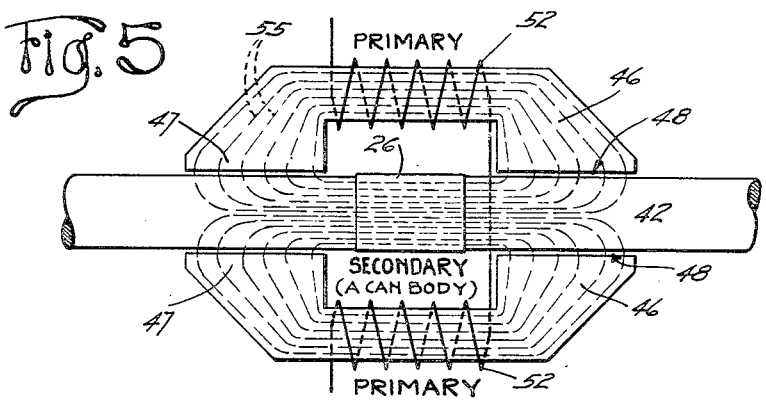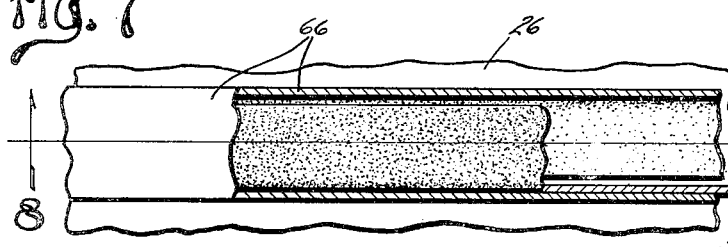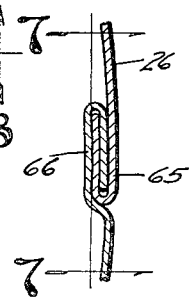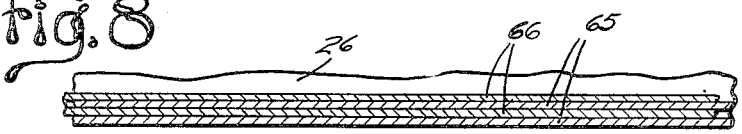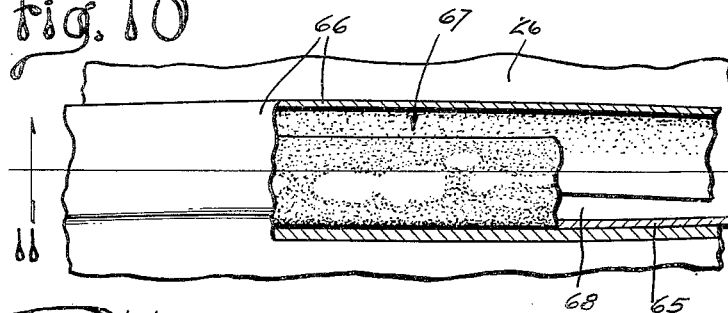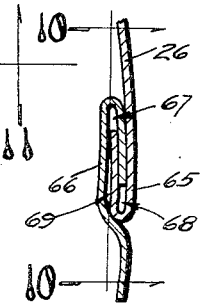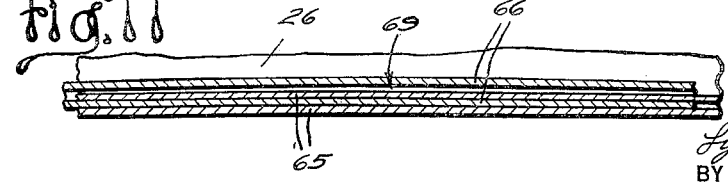

Patented Sept. 15, 1936

2,054,086

UNITED STATES PATENT OFFICE 2,054,086

METHOD OF SOLDERING CAN BODIES OR THE LIKE

Lyman L. Jones, Seattle, Wash., assignor to American Can Company, New York, N. Y., a corporation of New Jersey Application October 31, 1929, Serial No. 403,772

7 Claims. (Cl. 219—12)

The present invention relates to a method of soldering can bodies or similar tubular objects and has particular reference to the soldering of an object having a side seam.

The principal object of the present invention is the provision of a method for soldering side seams of can bodies which contemplates the preheating of the entire can body to preserve straight edges in the side seam and to prevent distortion or buckling of the adjacent can body parts.

An important object of the invention is the provision of a method for soldering can bodies wherein unequal temperature strains in the metal are avoided.

A further important object of the invention is the provision of a method for first preparing a can body for soldering and then for soldering the same wherein the entire body is uniformly heated throughout its mass preventing any unequal temperature in the body during the heating, soldering or a subsequent cooling thereof.

A further object of the invention is the provision of a method of soldering can bodies wherein open laps of the adjacent interlocking parts of the side seam of a can body are prevented and wherein the saving of solder is accomplished.

An important object of the invention is the provision of a method which contemplates the use of a relatively short solder roll applying solder at a relatively low temperature.

An important object of the present invention is the provision of a method which contemplates the reduction of the exposed surface of molten solder in a solder bath wherein there will be less oxidation of the solder.

An important object of the present invention is the provision of a method which dispenses with the necessity of using the latent heat in solder for raising the temperature of a can body being soldered by independently heating the entire can body previous to the soldering operation and using a lower temperature for the molten solder wherein there will be less oxidation thereof.

An important object of the invention is the provision of a method of soldering can bodies provided with a side seam wherein the width of the solder strip applied to the side seam is reduced to a minimum.

An important object of the present invention is the provision of a method of preparing a can body for soldering, soldering the same and thence wiping the solder on the side seam while the solder temperature is sufficiently high to avoid wiping streaks.

An important object of the present invention is the provision of a method of soldering the side seams of can bodies which utilizes a high frequency electrical current through which the can bodies are passed and by which the same are heated, the can body in becoming heated conducting excessive heat away from the electrical apparatus.

An important object of the present invention is the provision of a method of soldering can bodies by the proper preparation of the body prior to the application of solder thereto whereby a solder seam of a homogeneous character is provided without trapping air or gas therein.

A still further important object of the present invention is the provision of a soldering method for the side seams of can bodies wherein the can is heated prior to reaching the solder roll thus insuring a more rapid soldering action and avoiding the necessity of the soldering roll heating the can body for the soldering operation.

Numerous other objects and advantages of the invention will be apparent as it is better understood from the following description, which, taken in connection with the accompanying drawings, discloses a preferred embodiment thereof.

Referring to the drawings:—

Figure 1 is a typical layout in diagrammatic elevation of an apparatus for performing the present invention.

Fig. 2 is a plan view of a typical electrical transformer as embodied in Fig. 1.

Fig. 3 is a transverse sectional view through the transformer being taken substantially along the line 3—3 in Fig. 1.

Fig. 4 is a transverse sectional view taken substantially along the line 4—4 in Fig. 1.

Fig. 5 is a schematic wiring diagram of the electrical transformer used for heating the can body, illustrating the path of certain of the electrical currents.

Fig. 6 is a fragmentary sectional view through a typical side seam of a can body soldered according to the present invention.

Fig. 7 is a fragmentary longitudinal section taken substantially along the line 7—7 in Fig. 6.

Fig. 8 is a longitudinal vertical section taken substantially along the line 8—8 in Fig. 7.

Fig. 9 is a fragmentary transverse sectional view of a side seam of a can body of the same form and dimensions as that illustrated in Fig. 6 but showing one effect of the sudden application of heat to a part only of the can body side seam.

Fig. 10 is a fragmentary longitudinal section taken substantially along the line 10—10 in Fig. 9.

Fig. 11 is a longitudinal vertical section taken substantially along the line 11—11 in Fig. 10.

The present invention contemplates the heating of the entire can body prior to soldering of its side seam and one preferred form or type of apparatus for carrying out the invention contemplates the passage of the can body from the forming horn of the body forming machine along an extension of the horn successively past a fluxing station, a heating station, a solder applying station and a solder wiping station. The horn over which the can body is conveyed, where such a type of apparatus is used, is thus held at one end by the body forming machine and is supported at its opposite or discharge end by a mechanism which permits passage of the body along the horn and at the same time holds it in accurate alignment.

Such a typical apparatus as is illustrated also contemplates the continuous movement of the can body along the horn for the various operations. To insure a rapid and quick uniform heating of the entire can body, it is preferably passed through the magnetic field of an electrical transformer, part of the horn at this position acting as an armature for the transformer, the cores of the transformer being positioned on opposite sides of this armature and being fitted to lie closely adjacent to the path of the can body. The location and shape of these cores provide an annular air gap between the horn armature and the oppositely disposed core pieces of the transformer and it is through this annular gap that the can body is conveyed.

The flow of electric current through the cores and the armature and across the air gap provides a magnetic field for the moving can body conveyed along the horn and a secondary heating current is induced in the can body as it moves through this effective field of the transformer, the armature or horn also receiving, in part, this secondary heating current which is partially conveyed by conduction to the can body passing therealong. This passing of the can body through the magnetic field and the resulting heating action will be more clearly understood if reference be had to Fig. 5 wherein the lines of magnetic flux are shown in broken lines.

The apparatus used for the carrying out of the present invention comprises a body forming machine 21 (Fig. 1) provided with a forming horn extension 22 of the usual construction to which is secured a soldering horn 23. The opposite end of the horn 23 is intermittently engaged by horizontally opposed jaws 24 carried by sliding rods 25 operated in any suitable manner to permit release of the jaws 24 from the horn during the passage of a formed can body 26 therealong and to insure engagement with the horn at other times.

The horn 23 is also supported by a series of jaws 27 carried by vertically moving rods 28 which are actuated in any suitable manner to release the horn and permit passage of the can bodies thereover but to reengage and support the horn at other times. The rods 25 and 28 are slidably mounted in a horn supporting frame 29 mounted upon a base 31 extending throughout the length of the apparatus. An overhead conveyor chain 32 provided with spaced flights 33 passes at one end over an idler sprocket 34 mounted on a horizontal shaft 35 carried in bearings formed in the frame 29 and passes at its body forming end over a suitable driving sprocket in the usual or preferred manner.

The can body 26 as it is conveyed by the chain 32 along the horn 22 passes over a fluxing roller 38 mounted on a horizontal shaft 39 supported by a flux pot 41 mounted on the frame 31. The roller 38 rotates within a suitable fluxing bath in the regular and well known manner.

While it is generally desirable to flux the can body previous to heating it, there may be times when a fluxing of the seam during or following the heating of the can body would be more advantageous. In such a case the same fluxing device would be used and it would be located at the desired position along the horn.

After receiving flux on its side seam, the can body 26 passes along an armature section 42 of the horn 23. This armature section is preferably formed of horizontally disposed laminated plates 43 (Figs. 1, 2 and 3) and one end of the section is secured to the horn 22 in a dovetail connection 44. The opposite or forward end of the section 42 connects with the horn 23 in a dovetail joint 45.

An electrical transformer is positioned adjacent the armature section 42 of the horn and comprises a pair of laminated cores 46 of U-shape positioned opposite each other. Legs 47 of each of the cores 46 are spaced from but lie closely adjacent to the armature plates 43, there being one core 46 on each side of the horn. This spaced position of parts provides an air gap 48 (Figs. 3 and 5) of annular form surrounding the horn 42. The cores 46 are secured by bolts 49 to a frame 51 carried by the frame 31.

The wiring used in the transformer and surrounding the core pieces 46 comprises coils 52 which constitute the primary windings. The magnetic lines of force flowing in the core pieces 46 when an electrical current passes through these primary wiring coils 52 are indicated diagrammatically by the broken lines 55 in Fig. 5. As illustrated, these magnetic lines of force not only pass through the core pieces 46 but also through the armature 42 by moving across the air gap 48. By placing a core of equal magnetic strength on each side of the horn the magnetic forces acting on the horn and tending to draw it toward the cores are counterbalanced one with the other and displacement of the horn by this means is correspondingly avoided.

This construction induces a heating current in the armature 42 which by conduction heats the horn 22 of the body forming machine. The can body 26 passing along this heated horn 22 thus receives an initial amount of heat by conduction from the horn and as it passes through one of the air gaps 48 and into the magnetic field of the transformer, heating currents are induced in the body itself thereby rapidly raising its temperature. The passing can body during this time is also receiving heat by conduction from the heated armature as it moves therealong. This indirect heating by means of the armature accomplishes two desirable results, i. e. the can body is heated and the residual heat in the horn in passing into the can body is partly carried away from the magnetic field with the moving can body. The induced heating action on the can body continues until it has passed out through the other air gap.

This feature of conveying heat continuously from the magnetic field makes it possible to utilize a high frequency current in the transformer, the attendant heat developed, unlike most cases where such currents are used, being a desirable feature since it is utilized for the heating of a can body as described.

As the heated can body is further conveyed along the horn, it passes over a solder applying device which may consist of a solder roll 56 carried on a horizontal shaft 57 and rotating within a solder bath 58 mounted on the frame 31. The solder roller and shaft is constantly rotated in any suitable manner and carries a film of molten solder from the bath 58 into the side seam of the can body. This action of solder application is standard soldering practice and needs no further description, the soldering roller in the present instance, however, being relatively very short since it does not heat the can body but only applies sufficient solder to accomplish the soldering operation.

By using a relatively small bath the amount of solder is reduced and the surface exposed to air is correspondingly minimized. The solder temperature can also be reduced and both the lower temperature and the smaller exposed area minimizes oxidation of the solder and practically prevents formation of scum and dross.

The can body 26, with its applied solder, then passes over a wiping device which may consist of a wiping roller 61 continuously rotated with a horizontal shaft 62 mounted in a bracket 63 carried by the frame 29. Since the heat of the can body holds the heat in the solder of the seam for a longer time, this solder is more easily wiped without showing wiping streaks which result when the solder has congealed prior to wiping.

The different sets of jaws 24 and 27 are successively withdrawn from the surface of the horn 23 as the can body 26 passes therealong, these jaws reengaging the horn after such can passage. This insures a constant support of the free end of the horn and a holding of it in aligned position.

The effect of heat on a can body seam will now be considered, such a seam being illustrated in detail in Figs. 9, 10 and 11. The can body 26 is provided with a side seam which embodies an outer hooked edge 65 of one part of the blank and this is interlocked with a hooked edge 66 of an adjacent part. When the side seam of a can body is rapidly raised in temperature while the rest of the body remains relatively cold, heating strains are set up in the metal and when these strains become sufficiently great they cause a bowing or distortion of the interconnected parts 65 and 66 of the can body and they spread apart, as shown in Fig. 10.

This action results in the formation of air spaces 67, 68 and 69 adjacent the interlocked ends and solder applied to a seam in such a condition must either fill these spaces or be prevented from entering them by air or gas entrapped therein. If solder enters these spaces an unnecessary amount of solder is used in addition to the seam being substantially thickened by this solder excess and the distorted parts being held in distorted relation. In the cooling of such a can there are corresponding unequal strains set up owing to the differences in heat in the side seam and this often results in a cracking of the solder before it fully sets.

In the seam illustrated in Figs. 6, 7 and 8, the entire can body 26 has been equally heated according to the present invention and the closely fitting inter-connecting parts 65 and 66 not being acted on by heat strains in the metal remain in closed position tightly fitting one another. This completely avoids any opening of the laps or bulging of the metal and air pockets or spaces are not created in the seam. Solder applied to such a heated can body flows freely and easily in between the adjacent contacting walls of the interlocked parts 65 and 66 providing a homogeneous soldering area of uniform thickness and of maximum strength. During the cooling action, which follows the soldering of the parts, the entire can body uniformly cools since the entire can body has been brought to substantially the same temperature and this avoids any unequal strains or cracking of the solder at such time.

By reason of the bowing of the side seam in a can body made according to the local side seam heating method just described, the circumference of the can body is increased in places such as at its center and a true cylindrical body with a straight side seam is not produced.

A can body which has been previously and uniformly heated, according to the present invention, retains its heat longer and holds the solder in its seam partially fluid and in proper condition for wiping. A seam so formed therefore uses a great deal less solder, the width of the solder applied being reduced to a minimum consistent with a good joint, the solder in the seam is of uniform thickness throughout its entire area and any danger of cracks or inequalities is entirely absent. This effects a substantial saving in the cost of solder used and insures against possible serious losses by reason of non-uniform seams.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. The method of soldering can bodies which comprises, conveying can bodies progressively along a predetermined path, subjecting each entire can body during its movement to the influence of a varying magnetic field while out of contact with soldering means whereby said can bodies are heated, and then applying solder to the seam of said heated can body.

2. The method of soldering the longitudinal side seam of a can body, which consists in passing the same through a varying magnetic field to heat the same during travel of the can body through said field, and then applying solder to the heated side seam of the can body.

3. The method of soldering the longitudinal side seam of a can body, which consists in passing the same through a varying magnetic field to heat the same during travel of the can body through said field, and then applying molten solder to the heated side seam of the can body upon completion of the heating step.

4. The method of soldering can bodies which comprises, conveying can bodies processionally along a horn and through a varying magnetic field which enters the horn at right angles to its axis, whereby heating currents are induced in each of said can bodies during the travel of said can bodies thereover, and then applying molten solder to the heated seam of a said can body while still on the horn.

5. The method of soldering the formed side seams of can bodies to prevent distortion of the seam as a result of unequal temperature strains, which comprises conveying can bodies processionally along a horn and through a varying magnetic field which enters the horn at right angles to its axis, to preheat the entire can body independently of heated solder, advancing said body to a soldering station and then filling the interstices of said heated seam with solder.

6. In a can-soldering apparatus the combination of elements arranged in succession, comprising a heating station, a solder-applying station, a horn along which said elements are arranged, the heating station having inner and outer magnetic cores disposed to form an annular air-gap through which the can body may pass on said horn, and means for forming a magnetic field in said air gap whereby a secondary heating current is induced in said can body during passage of the latter through said annular air-gap.

7. In an apparatus for soldering the side seams of metallic can bodies, in combination: a horn along which said side seamed can bodies are successively advanced, a part of said horn comprising an armature section, magnetic cores adjacent said section to provide an extended magnetic field which penetrates the wall of an advancing can body, means for variably energizing said magnetic cores to induce a heating current in said can bodies as the latter advance over said section to preheat said bodies for a subsequent soldering operation, and means for applying solder to said preheated seamed can bodies.

LYMAN L. JONES.